US007010293B2

(12) United States Patent
Go

(10) Patent No.: US 7,010,293 B2
(45) Date of Patent: Mar. 7, 2006

(54) DIGITAL ADVERTISING METHOD UTILIZING A CELLULAR TELEPHONE DISPLAY

(75) Inventor: Eiroku Go, Tokyo (JP)

(73) Assignee: Kabushiki Kaisha CSD, Tokyo (JP)

( * ) Notice: Subject to any disclaimer, the term of this patent is extended or adjusted under 35 U.S.C. 154(b) by 841 days.

(21) Appl. No.: 09/746,191

(22) Filed: Dec. 22, 2000

(65) Prior Publication Data

US 2002/0022476 A1    Feb. 21, 2002

(30) Foreign Application Priority Data

Aug. 4, 2000    (JP)    .............................. 2000-237149
Sep. 25, 2000    (JP)    .............................. 2000-290290

(51) Int. Cl.
*H04M 11/00*    (2006.01)

(52) U.S. Cl. .............................. 455/414.3; 455/412.2; 455/503; 455/566

(58) Field of Classification Search ................ 455/419, 455/414.1, 414.2, 414.3, 566, 503, 412.2
See application file for complete search history.

(56) References Cited

U.S. PATENT DOCUMENTS

| | | | | |
|---|---|---|---|---|
| 5,999,088 A | * | 12/1999 | Sibbitt | ........................ 340/7.55 |
| 6,031,467 A | * | 2/2000 | Hymel et al. | .............. 340/7.49 |
| 6,484,011 B1 | * | 11/2002 | Thompson et al. | ......... 455/3.06 |
| 6,526,275 B1 | * | 2/2003 | Calvert | ........................ 455/418 |

\* cited by examiner

*Primary Examiner*—Temica Beamer
(74) *Attorney, Agent, or Firm*—Carella, Byrne et al.; Elliot M. Olstein; William Squire

(57) ABSTRACT

A digital advertising method in a cellular telephone having three types of advertisements. One is an N type for broadcasting advertisements from a central exchange to relay stations at specific times. Another is emergency notification as a warning message or image data from a local government and is transmitted to affected areas. In both cases, data is broadcast without a communication being established to a receiver. One to one type calls are an ordinary person to person call. The receiver selects categories and types of advertisements. The advertisement content includes advertising data, advertiser's inquiry telephone number, data, and web site address. The contents are stored in memory of the cellular telephone. The stored advertisements are replayed on a screen of the cellular telephone by pushing predetermined function keys. The contents may be downloaded from a web site, replayed the screen of the cellular telephone and on home audio/video devices.

7 Claims, 5 Drawing Sheets

FIG.3
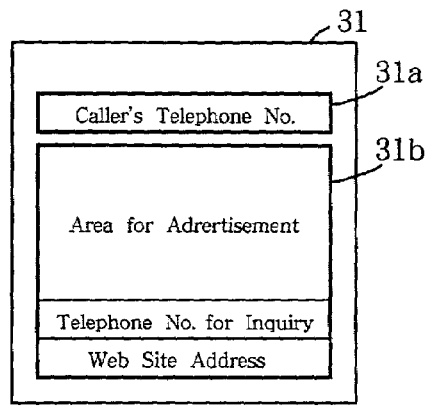
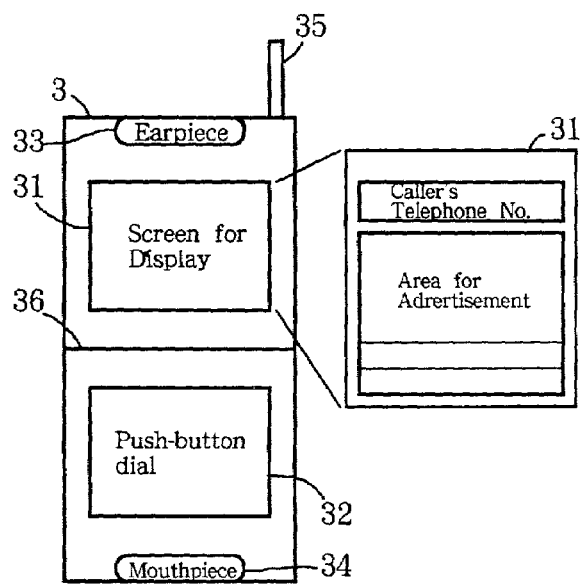
FIG.4A
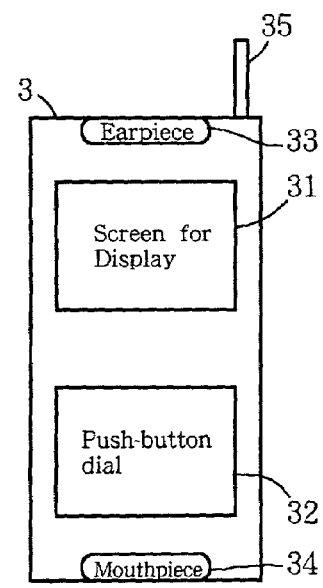
FIG.4B

FIG.5A
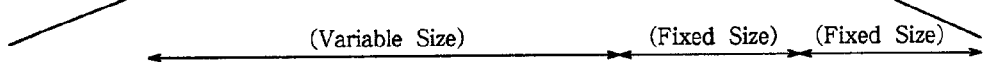
FIG.5B
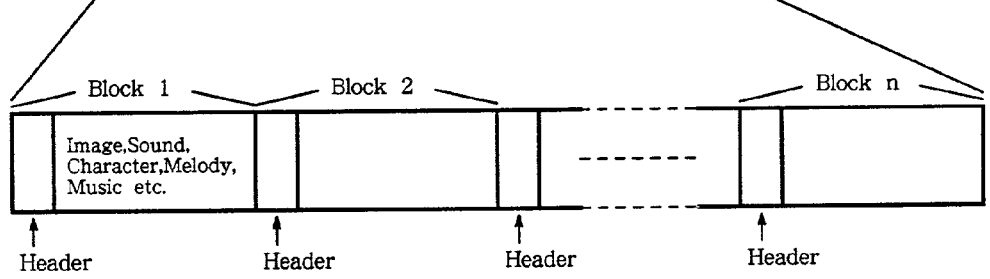
FIG.5C

DIGITAL ADVERTISING METHOD UTILIZING A CELLULAR TELEPHONE DISPLAY

BACKGROUND OF THE INVENTION

1. Field of the Invention

This invention relates generally to the field of advertising, and more particularly to a process for a display screen of a cellular telephone to be used as a medium for a digital advertising system.

2. Brief Description of the Prior Art

In recent years, cellular telephones are used widely and spreading remarkably well among younger generations, business people and elders. There are two wireless telephone systems: analog and digital. A digital system has been becoming dominant over the analog system due to superiority of signal clarity. Quite recently, a network function was added to wireless telephones, and many people now use the Internet through wireless telephones. The current wireless telephone explained above has a liquid crystal display screen, but it is able to display only limited information, such as a caller's telephone number and retrieved information (e-mail) by users. The cellular telephone technologies are advanced in Japan, for example, bigger display screen and able to display colored images. The current wireless telephone technologies only allow conversations and limited information exchange. Furthermore, it is not possible to transfer broader ranges of information to certain people, such as an emergency notification to an affected geographic area.

Our invention was created to solve the problems mentioned above and to an object to provide a digital advertising method through a display screen of a cellular telephone, which is able to obtain various kinds of information, such as advertiser information and emergency notification without changing the conventional functions and software.

SUMMARY OF THE INVENTION

The primary object of the invention is to use the display screen of a cellular telephone as an advertising medium to provide broader ranges of digital advertising data (image, sound, character, music, movie, etc.).

Another object of the invention is to provide advertisers with alternative advertising methods to capture targeted consumers.

Another object of the invention is to provide a cellular telephone user a way to obtain various kinds of digital data by their own pre-selected categories with ease, for example, an auto-redial to the advertiser telephone number and auto-link to the requested advertising web site on the Internet, which increases convenience.

A further object of the invention is to provide a telephone company with an opportunity to add advertising sales function and increase revenues, then to decrease telephone charges in a whole.

Yet another object of the invention is to provide a cellular telephone user with reduced service costs paid by advertisers.

Still yet another object of the invention is to provide a government agency with a faster emergency notification to affected geographic areas.

Other objects and advantages of the present invention will become apparent from the following descriptions, taken in connection with the accompanying drawings, wherein, by way of illustration and example, an embodiment of the present invention is disclosed.

A digital advertising system of the present invention utilizes a display screen of a cellular telephone wherein a display screen of a receiver (addressee) is used as an advertising medium. The advertisements are classified into respective categories, such as sports, shopping, and investing, among which only pre-selected and accepted categories' advertisements by the receiver are broadcast on the display screen. Emergency information such as earthquakes and hurricanes are included in the classified advertisements. Contents of the advertisements include transferred advertising data as well as advertiser's inquiry telephone number and web site address, which a receiver is able to access to the web link directly to surf the web site and to buy merchandise through the display screen. The contents of advertisements are stored in a memory installed in a cellular telephone, which are replayed by pushing predetermined function keys.

BRIEF DESCRIPTION OF DRAWINGS

FIG. 3 is a plan view of a display screen of the cellular telephone used in the embodiment of FIG. 1.

FIG. 4A and FIG. 4B illustrate surface structure of the cellular telephone used in the embodiment of FIG. 1.

FIG. 5A, FIG. 5B, and FIG. 5C illustrate an example of transmission data format.

DETAILED DESCRIPTION OF THE PREFERRED EMBODIMENT

The drawings constitute a part of this specification and include exemplary embodiments of the present invention. It is to be understood that in some instances various aspects of the invention may be shown exaggerated or enlarged to facilitate an understanding of the present invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention utilizes a display screen of a receiver's cellular telephone (includes a PHS terminal) as a medium for advertisements, which advertisement data is displayed on the receiver's cellular telephone screen when a request call (advertisement call or normal person to person call) is received. Advertisements are divided into categories, such as sports and shopping, and each category is divided into several types, such as football, baseball, and tennis. A cellular telephone holder can select one or several categories and types based on their interests by pushing function keys and pushbuttons on the cellular telephone. If several advertisement data are received, each of them is displayed according to a registered order per each request call.

Advertisers request an advertising agency to use this digital advertisement method through a cellular telephone to advertise their merchandise and services. Advertising charges are calculated in proportion to size and amount of advertised data and frequency of transmitted advertisements to be broadcast.

In the case of one to N type, advertisements are generated from the Advertisement/Registration database at a Central telephone exchange then transmitted to specified areas (specified relay stations) or to all cellular telephones (all relay stations). In the case of an emergency notification, breaking news (earthquake and natural disaster) is transmitted to all cellular telephone holders in the concerned areas (specified relay stations). In both cases, the data is broadcast without a communication being established to a receiver. In the case of one to one type (an ordinary person to person call), advertisements are displayed on the screen of a receiver's cellular telephone when a communication is established between a caller and a receiver.

Pre-assigned identification codes are set up to identify and select whether the type of request call is one to N, particularly which category of advertisement, an emergency notification or one to one type. For example, Tennis in sports is #85, an emergency notification is #999, person to person (one to one) type of telephone call is #800, and absence call is #803.

Figure 1:
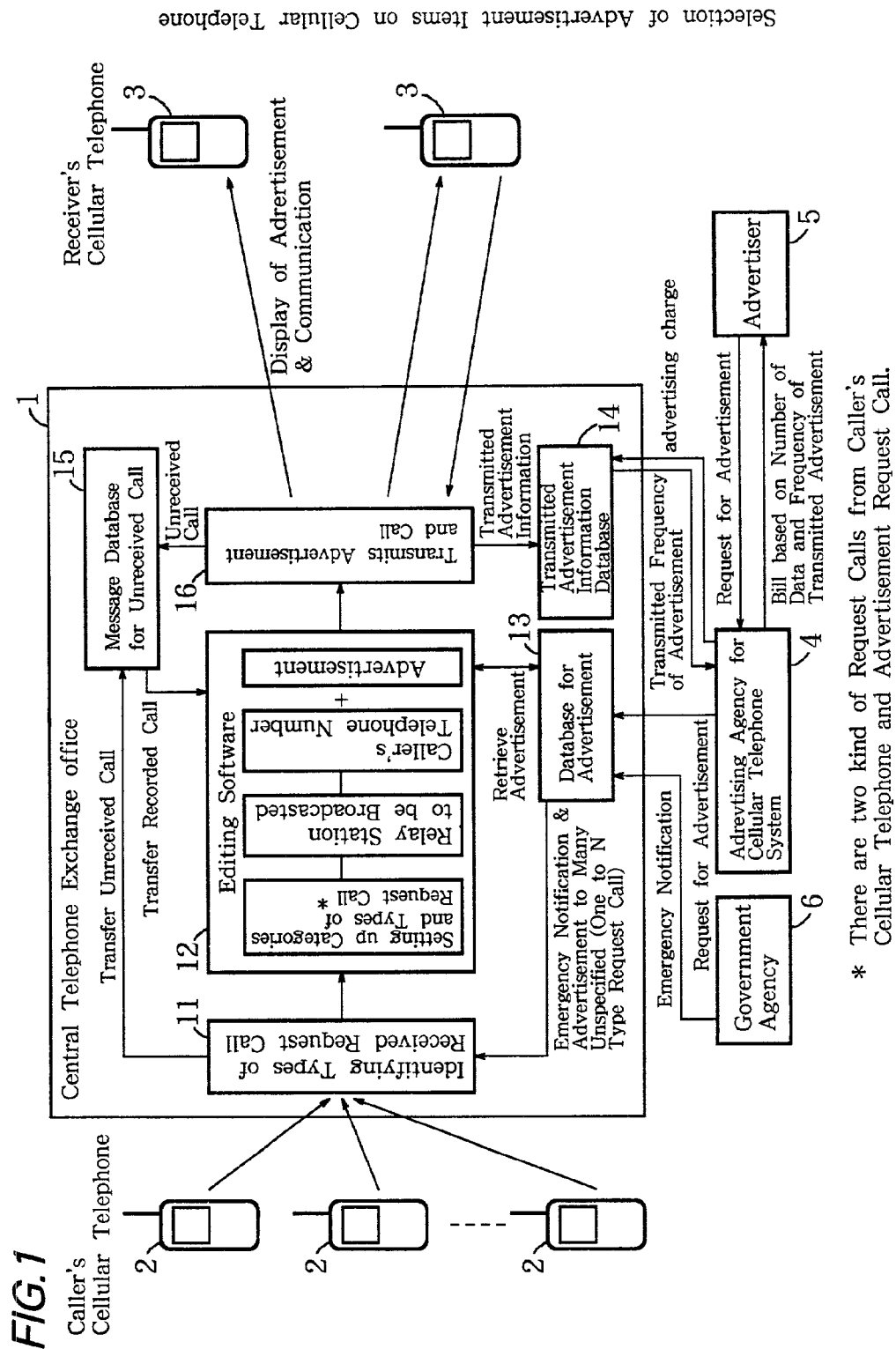
FIG. 1 is a block diagram to illustrate a cellular telephone advertising system in accordance with an embodiment of the present invention.

FIG. 1 is a block diagram which illustrates a system structure in this embodiment where advertisement data requested from advertisers (including an emergency notification data) are placed. On the same figure, a numerical character I is a Central telephone exchange office, a numerical character 2 is a Caller's cellular telephone, and a numerical character 3 is a Receiver's cellular telephone. A numerical character 4 is an Advertising agency that receives an advertisement order from an Advertiser 5 and charges transmission fees based on size and amount of advertised data and frequency of transmitted advertisements to inform the Advertiser 5. The Advertising agency requests the Central telephone exchange office 1 to transmit the advertisement data, and the Central telephone exchange 1 informs the Advertising agency of all the transmitted advertisement charges. A numerical character 6 is a Government agency that requests the Central telephone exchange office to broadcast emergency information on the display screen of the cellular telephone 3 (receiver). A numerical character 11 in the Central telephone exchange office I is software to process receiving request calls: an advertisement call from Advertisers and Government agency or ordinary person to person telephone call from the Cellular telephone 2. A numerical character 12 is software to edit data, which designates the identification code (one to N, emergency notification or one to one) and relay stations to broadcast and to output advertisement data. In the case of one to one type, a caller's telephone number is included. A numerical character 13 is a database to store advertisement data to be broadcast and the registration information for one to one type of calls, where registered cellular telephone numbers, categories and types of advertisement that a cellular telephone holder uploaded to the database to accept beforehand are stored. A numerical character 14 is a database to record the frequency of the respective advertisements that were transmitted to a receiver's cellular telephone. A numerical character 15 is a message database to store unreceived calls (person to person calls). A numerical character 16 is software to transmit the edited data to the receiver's cellular telephone 3. In the case of one to one type, this software will not only transfer advertisement, but also put through a person to person call.

Figure 2:
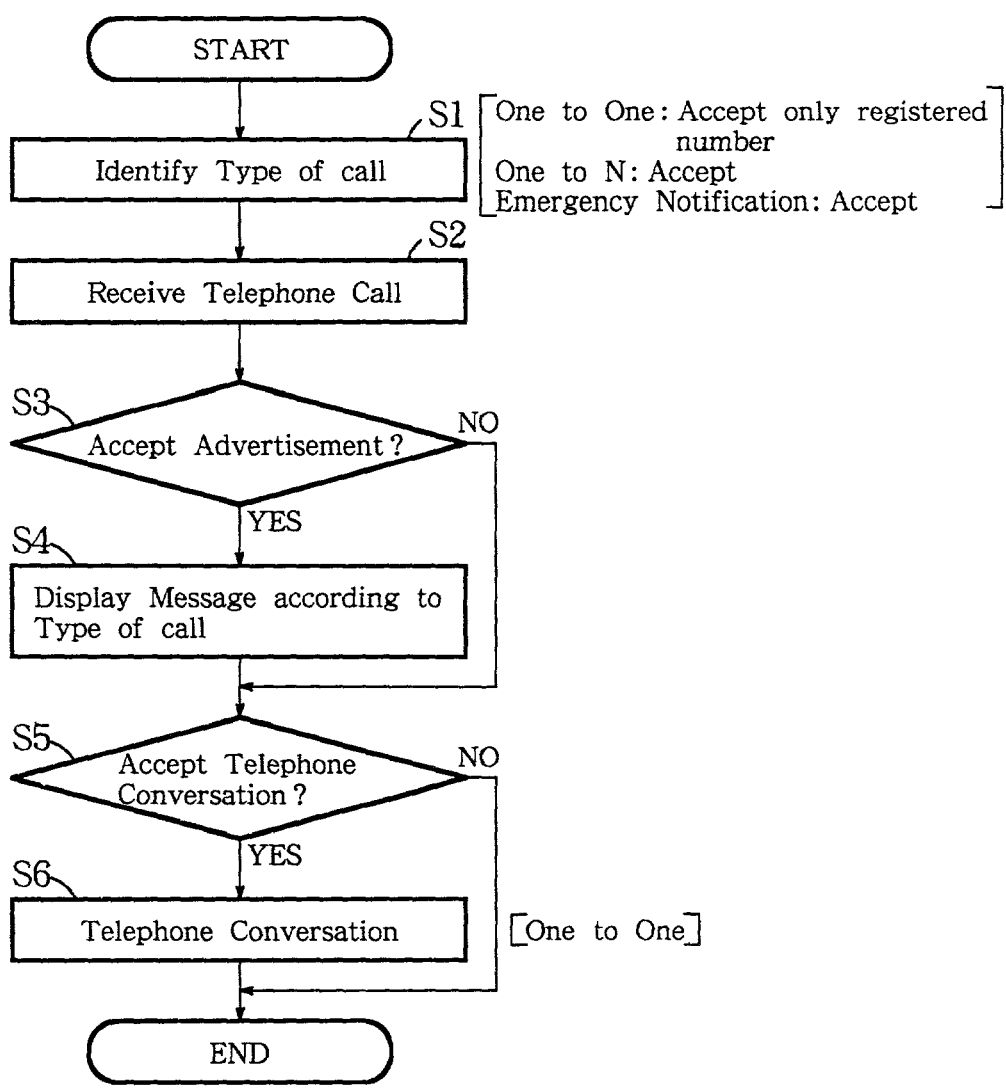
FIG. 2 is a flow chart showing processes for how a request call is received at a receiver's cellular telephone in the system embodiment of FIG. 1. There are two kinds of request calls: one is an advertisement call generated from an advertisement database, namely a broadcasting data requested from advertisers (one to N type) or government agencies (emergency notification) to unspecified cellular telephone holders. The other is an ordinary person to person call (one to one type).

FIG. 2 is a flow chart to show processes of how a request call is received on the receiver's cellular telephone 3. When a request call is made, first the type of the request call (Si), such as one to N, emergency call or one to one is identified. Next, a cellular telephone 3 receives the request call (S2), then whether the transmitted advertising data is acceptable is checked (53). If it is acceptable, the advertising data is received and displayed according to pre-selected categories and types of advertisement (54). In the case of one to one calls, when a conversation button is pushed (S5), an ordinary conversation (56) over the telephone starts.

FIG. 3 illustrates a displaying screen (31) of the above-mentioned receiver's cellular telephone 3, which is divided into a caller's telephone number (31a) and advertising data (31b) that constitutes an advertising area, telephone inquiry number and web site address of the advertiser. The caller's telephone number will be displayed on one to one type of calls, but it might not be specified on one to N type.

FIGS. 4A and 4B diagrammatically illustrate the outside appearance of a representation of a currently available cellular telephone 3. FIG. 4A illustrates a foldable cellular telephone, and FIG. 4B illustrates a one-piece cellular telephone. In these figures, a numerical 32 is a push-button dial, 33 is an earpiece, 34 is a mouthpiece, 35 is antenna, and 36 is a folding line of the cellular telephone.

Hereinafter how a cellular telephone holder registers the categories and types of advertisement and a timing to display advertisements on the displaying screen is explained.

For the registration, a cellular telephone holder is able to select categories and types of advertisements by pushing certain function keys and dial-buttons. The selected information will be stored in the installed memory on the cellular telephone. For a registration for one to one type of calls, the inputted selection of categories and types of advertisements are able to be uploaded to the Advertisement! Registration database 13 in the Central telephone exchange office, for example by dialing a toll-free number.

As to timing, in the case of one to N type of calls, an advertisement is displayed when a Central telephone exchange office generates a request call to specified areas (specified relay stations) or to all cellular telephones (all relay stations) at a specific time or predetermined timing requested from advertisers. In the case of one to one type of calls, an advertisement as well as a caller's telephone number are displayed when a request call is received but before a conversation starts. The transmitted advertisement data and its frequency are counted and recorded each time the data is transferred. On advertising settlement day, the amount based on accumulated number of advertisement data and its frequency will be billed to advertisers. The advertisement data on the cellular telephone display will be switched to the next one when another request call (advertisement call or ordinary person to person to call) is made or the receiver pushes a function key to switch. Otherwise, the same advertisement data is displayed. When several advertisements are received, the advertisement data will switch one after another when a receiver retrieves it. Recorded advertisement data in the memory on a receiver's cellular telephone are replayed according to certain function keys. Also, a content transferred and recorded from an advertiser web site will be able to be replayed. Recorded contents are also able to be connected to home audio/video devices and be replayed on them. In the case of one to N type, advertisements are displayed at specified times or predetermined timing at specified or unspecified geographical areas. In the case of an emergency notification, an urgent warning is displayed at the affected designated areas as needed.

Turning now to FIG. 1, each function (block) in the central telephone exchange office 1 is explained in detail.

(1) Receiving Software 11 to process receiving request calls: There are two kinds of request calls: an advertisement call generated from an advertisement database (one to N type or emergency notification) or an ordinary person to person call. Also, a registration call for one to one type when a cellular telephone holder uploads the inputted selection of advertisement categories and types is included to pass through here. This software identifies the type of request call by a code, for example, an advertisement call about Tennis in sports is #85, emergency notification is #999, person to person (one to one) type of telephone call is #800, and absence call is #803. Then, the request call is moved to Software 12, which edits data to be transferred. When the receiver is absent, the request call is connected to the Message database 15 to record a message.

(2) Editing Software 12: This software is to designate categories and types of advertisements and relay stations to broadcast and to retrieve designated advertisement data from the Advertisement! Registration database 13. The caller's telephone number will also be edited, but might not be specified on one to N type of calls. In the case of one to one type, this software first confirms whether the receiver's cellular telephone is registered to accept advertisements. Next, this software looks up the categories and types a cellular telephone holder registered at the Advertisement/Registration database 13, from where appropriate advertisements are retrieved.

(3) Advertisement/Registration database 13: This database stores advertisement data and the registration information for one to one type calls. The advertisement data part of database is divided and stored by categories (e.g. sports, shopping, etc.), which are also divided into types (e.g. football, baseball, etc.). The registration information part of database is the information needed for one to one type of calls to process, which stores the registered cellular telephone numbers and their selection of categories and types of advertisement that cellular telephone holders uploaded to accept beforehand, for example by a toll free number. Advertising agency 4 registers the advertising data requested from advertisers (companies) to this database located in the Central telephone exchange office 1. In the case of one to N type or emergency notification, a request call (advertisement call) is generated from this database, then carried over to the Receiving Software 11.

(4) Transmitted Advertisement Information Database 14: This database will count and record the size and amount of advertisement data and frequency of the respective transmitted advertisements during the advertisement period specified. This database is set up to record previous month and current month. Before the period closing date, the current month data is reset to zero after the existing month data is transferred to the previous month database.

(5) Message Database for Unreceived Calls 15: In the case of one to one (person to person) type of calls, when a receiver is absent, this database will record the call (message) in the database. This database will transfer the recorded call to the Editing Software 12 when the receiver retrieves it.

(6) Software 16 to transmit data: In the case of one to N type of calls and an emergency notification, this software will transmit the edited advertisement data and breaking news to the receiver. In the case of one to one type of calls, this software will transfer the edited advertisement data then put through a person to person call to a receiver 3 or go to Message database 15 to record a message when the receiver is absent.

(7) Charging Software: Although it is not shown in the figure, there is software to charge advertising fees. This charging software calculates fees and issues a bill based on the number of characters or number of bytes of advertising data and frequency of transmitted advertisements recorded at Transmitted advertisement information database 14.

(8) Advertising Agency 4: This agency registers the advertising data and the broadcasting timing requested from Advertiser 5 to the Advertisement! Registration database 13 in the Central telephone exchange office 1, which will send a bill in proportion to the number of characters, bytes and frequency of the advertisement (according to the amount in previous month database) to the Advertising agency who will forward the bill to advertisers. In some cases, the Central telephone exchange office sends a bill to the Advertiser 5 directly. Also, the Central telephone exchange office will charge service fees to the Cellular telephone advertising agencies to provide the services/functions described in FIG. 1.

FIGS. 5A, 5B and 5C illustrate a data format transferred to the receiver. The format, FIG. 5A, is divided into five sections: Type of request call, Relay station, Telephone number, Transmitted advertising display data (e.g. image, voice, characters, music, movie), and Conversation (or Recorded answering message). The format section for the Telephone number might not be needed because in one to one type of calls the caller's telephone number is automatically displayed on the current cellular telephone, and it might not be specified in one to N type of calls. Type of request call in FIG. 5A is a data section to identify the type of request call by a code, for example, an advertisement call (one to N type of call) about Tennis in sports is #85, emergency notification is #999, one to one type of telephone call is #800, and absence call is #803. Relay station is a data section to specify a relay station area to broadcast. Telephone number is a data section to display a caller's telephone number, but In the case of one to N type and emergency notification, the telephone number might not be specified. Transmitted advertising display data consists of Header, Blocks for transferred data. Telephone inquiry number, and Web site address of advertiser, illustrating by FIG. 5B. Header is an attribute section to specify the data type, number of blocks and length of the transferred data.

Blocks for Transferred data in FIG. 5B are a data section whether the transferred data is image, voice, character, melody, music, or movies, illustrating in FIG. 5C. This makes an assumption where the data is transferred after being divided into several blocks (1–n). Each block is reserved to record information either image (e.g. JPEG), sound (e.g. Wave format), character (e.g. Text), melody (e.g. midi) or music (e.g. MP3). In some cases, only one block will be used to send a whole display data, but the head of the block (Header) specifies the attribute, such as type of data, number, and length.

Telephone inquiry number is a place to specify the advertiser's inquiry telephone number data. Web Site Address is a place to specify the web site address (URL) of the advertisement Information. When the data is unilateral letter message, the advertiser's inquiry telephone number and its web site might not be specified. By the way, URL is an abbreviation of Uniform Resource Locator, which is an address expression to specify the numerous source of information on the Internet and is expressed, for example, in the following form: http://www.csd-comway.com.

Figure 6A:
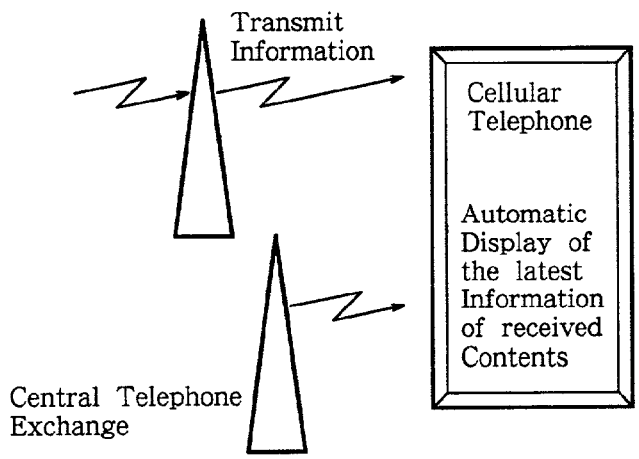
FIG. 6A illustrates an automatic function to transmit information.
Figure 6B:
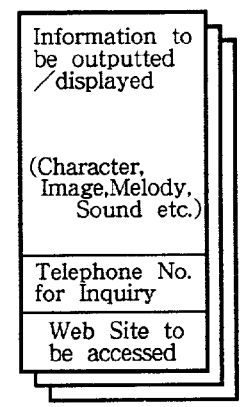
FIG. 6B is a content of display information.

FIGS. 6A and 6B illustrate an automatic transmission function in the present embodiment, where FIG. 6A describes the flow to transmit information, and FIG. 6B illustrates a memory content to store transmitted information: Advertising display data, Telephone inquiry number and Web site address to be accessed. A cellular telephone holder is able to automatically call the listed advertiser inquiry number by pushing a specified auto-dial key on a cellular telephone. Furthermore, when the cellular telephone holder pushes an auto-connection/link key, it will connect to the Internet service provider server, Internet connection center, or advertiser server. This function allows a cellular telephone to connect to the advertising contents (web site) automatically, which shows the advertised merchandise or service information in detail, and is able to buy it through the cellular telephone. In the future when the memory capacity of cellular telephones are increased, movie, music and game contents will be able to be received and replayed in the form, for example, MPEG3. Also, the memory explained in the FIG. 6B to store advertisement contents will be used in cycle, and if the memory is full, the newest advertisement information will overwrite the old one.

As to a sound system, a calling sound will be played on one to one type of calls, but not on one to N type. In the case of an emergency notification, a warning alarm sound will be played to distinguish it from a normal call. A cellular telephone holder also has a choice to turn off the sound by pushing a specific key.

Figure 7A:
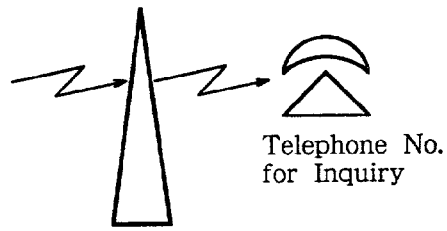
FIG. 7A and FIG. 7B illustrate an automatic function to connect to advertiser's data, such as telephone number and web site.
Figure 7B:
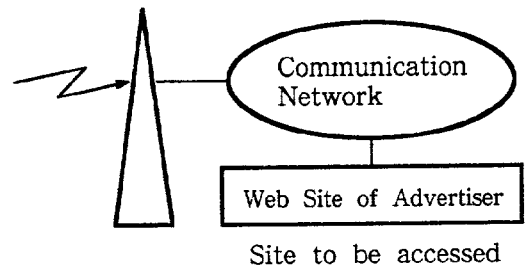

Next, the detailed operations regarding an automatic transmission: auto-dial and auto-link on a receiver's cellular telephone side are explained step by step.
1) Usually the latest information is displayed on the cellular display screen.
2) The transmitted advertisement data stored in the memory will be retrieved/referred one after another by scrolling up/down or arrow key.
3) To make an automatic call: The advertiser inquiry telephone number displayed on the screen of the cellular telephone will be automatically called by pushing a specified key or a combination of function keys, see FIG. 7A.
4) To make an automatic link to the advertiser's web site: The advertiser's web site is automatically connected according to the web site address (URL) specified in the transmission data memory by pushing a specific key or a combination of function keys, where the data on the web site is automatically displayed. After that, a cellular telephone holder is able to see detailed advertising information or to enter input for purchase information according to the web site instructions.

The present invention is to use a display screen of a cellular telephone as a medium of digital advertisement, which has three types of advertisements. One to N type is to broadcast advertisements generated from Central telephone exchange office to unspecified or specified replay stations at specific time or predetermined timing requested from advertisers. An emergency notification is a warning message or image data from a local government agency, which is generated from a Central telephone exchange office and transmitted to affected areas. And, one to one is an ordinary person to person call. A code is set up to identify the type of request call, for example, an advertisement call of Tennis in sports is #85, emergency notification is #999, one to one type of telephone call is #800, and absence call is #803. Our invention has an object to make it easy for the public to obtain various kinds of information, including advertisements and emergency information. Other objects are to provide alternative efficient and convenient advertising methods to companies and advertising agencies, to provide telephone companies with a way to add advertising sales function and increase its revenues, which will decrease the costs of phone services in a whole. Another object is to provide consumers with a way to be able to obtain information instantly by an auto-dial and auto-link to company web sites, and even being able to buy merchandise or services on the Internet through the cellular telephone, which is very convenient and inexpensive compared to having a computer to connect to the Internet at home/office. At the same time, advertisers will pay the costs of advertisement through cellular telephones, which will decrease the costs of telephone service fees and increase the use of cellular telephones. The cellular telephone holders can pre-select categories and types of advertisements to be broadcast, which is convenient and a target marketing strategy. The present invention will enhance the economy and public welfare and improve the living conditions by this convenient use of cellular telephones. Also, an emergency notification through a cellular telephone will increase the speed of how warnings, such as river floods and hurricanes will reach individuals and improve the safety of everyone.

The present invention only has to add and modify functions specified in the FIG. 1 at Central telephone exchange office. Cellular telephone holders 3 only have to add three functions. One is to add a function to identify a type of request call by a code, and the cellular telephone is set to be able to receive a request call by a code. The second is to add a mode to select acceptable categories and types of advertisements specified by pushing numerical selections on a cellular telephone. The last is to increase the amount of memory to be able to store many pages of advertisement images and contents and to modify a display function (change software in CPU) on cellular telephones. The received advertisement data will be recorded in order, and if the memory is full, the new data will overwrite the old one. The recorded data will be able to be retrieved later. As explained, the basic functions of the Central telephone exchange office and the current cellular telephone system stay the same, and it is easy to put this invention into practice by changing and adding software.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A digital advertising method in a cellular telephone system comprising:
broadcasting selected advertisements for display on a display screen of a cellular telephone receiver receiving a request call in the system;
displaying the selected advertisements on the cellular telephone display screen of the receiver; and classifying the advertisements into respective categories among which pre-selected and approved categories' advertisements by the receiver are received on the display screen, and classifying emergency information in the classified categories.

2. The digital advertising method according to claim 1 further including digital broadcast type advertising, and the broadcasting step includes advertising data, advertiser's inquiry telephone number, data, and web site address for transfer to the receiver.

3. The digital advertising method according to claim 2 further including digital broadcast type advertising, and storing the transferred contents of advertisements in a memory installed in the receiver cellular telephone.

4. The digital advertising method according to claim 3 further including the step of replaying the stored contents of the advertisements on the screen of the cellular telephone by pushing predetermined function keys.

5. The digital advertising method of claim 3 further including the step of downloading the contents of the advertisements by a link to a web site and replaying the downloaded contents on the screen of the cellular telephone and on a home audio/video device.

6. The digital advertising method of claim 1 further including digital broadcast type advertising, and including selecting the categories from the group consisting of emergencies, sports, shopping, and investing.

7. A digital broadcast type advertising method in a cellular telephone system comprising:

a one to N type broadcasting to broadcast advertisements generated from a central telephone exchange office to unspecified or specified relay stations at specific time;

an emergency notification type broadcasting to broadcast a warning message or image data from a local government, which is generated from the central telephone exchange office and transmitted to affected areas;

a one to one type communication as an ordinary person to person call wherein the data is broadcast without a communication being established to a receiver in the one to N type broadcasting and in the emergency notification type broadcasting;

advertisements are displayed when a communication is established between a caller and a receiver;

classifying the advertisements into respective categories and only the selected advertisements in the categories are displayed where the receiver has pre-selected and approved on the cellular telephone display screen of the receiver; and the classified categories include emergency information.

* * * * *